Sept. 14, 1937.  G. P. REGAN ET AL  2,092,931
METHOD AND MEANS FOR SYNCHRONIZING SOUND FOR MOTION PICTURE PRODUCTIONS
Filed Feb. 11, 1935  2 Sheets-Sheet 2
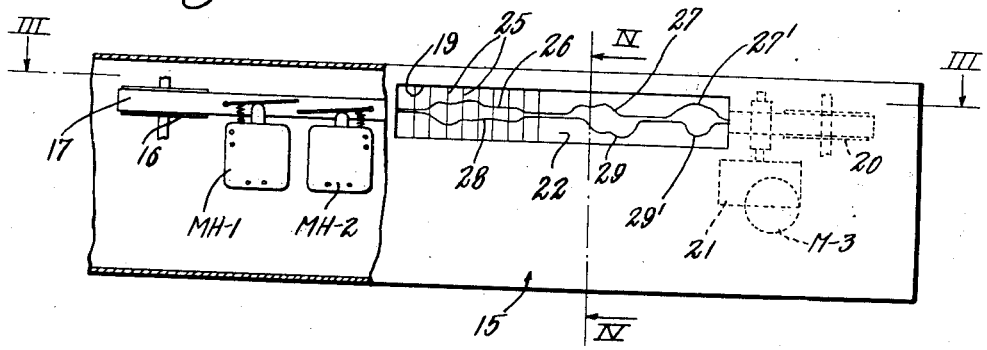
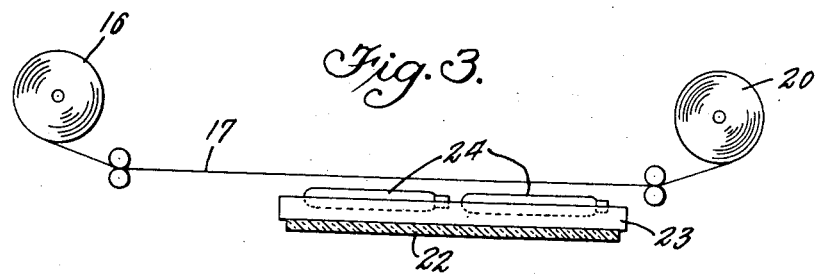
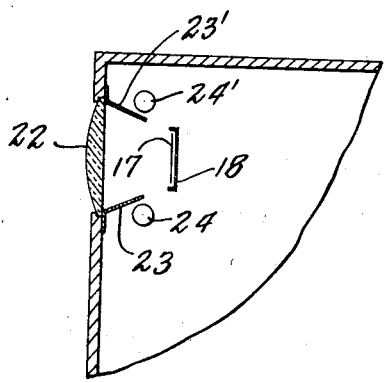
INVENTORS
George P. Regan
Charles S. Franklin
BY Lyon & Lyon
ATTORNEYS Patented Sept. 14, 1937

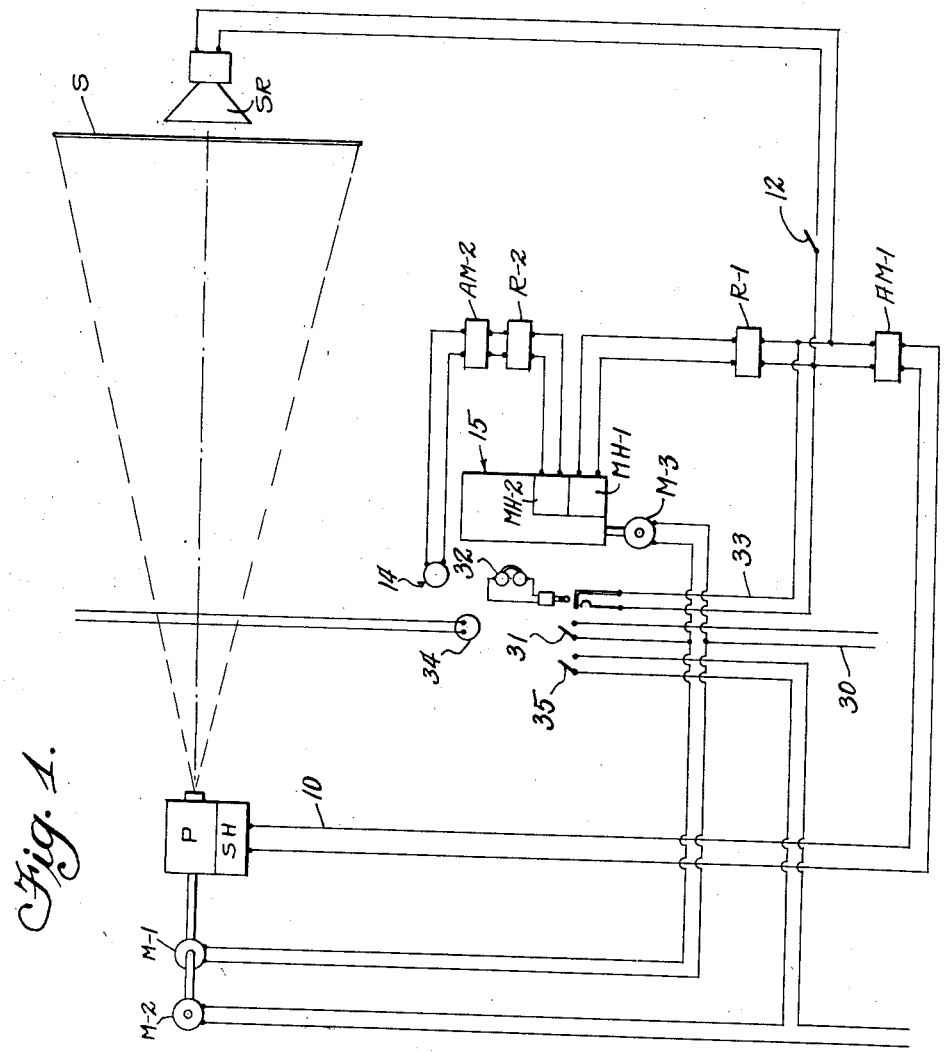

2,092,931

UNITED STATES PATENT OFFICE 2,092,931

METHOD AND MEANS FOR SYNCHRONIZING SOUND FOR MOTION PICTURE PRODUCTIONS

George P. Regan and Charles S. Franklin, Los Angeles, Calif., assignors to Regan-Day, Inc., Los Angeles, Calif., a corporation of California Application February 11, 1935, Serial No. 6,052

21 Claims. (Cl. 179—100.3)

This invention relates to the art of recording sound for reproduction purposes. By sound as used hereinafter, reference is made to vocal, instrumental or other coherent sound. It is to be understood that the recording of such sound for reproduction purposes may be accomplished in several ways, for example, photographically on film by either the variable area or variable density methods, on discs, or by various other methods.

The present invention is not specifically directed to the actual recording of sound for reproduction purposes but is more particularly directed towards means and methods whereby the tempo and amplitude of sound being rendered for recording purposes may be carefully controlled.

In order to facilitate the understanding of this invention, the subsequent description will be particularly directed to the application of the means and methods embraced by this invention to the art of "dubbing" and rerecording sound. In the event a motion picture with accompanying sound, such as the human voice, has been completed in a given language, say the English, and it is now desired to utilize the same pictorial representations but introduce a foreign language version of the sound, the operation of so substituting a foreign language for the English language version is termed "dubbing". In the event the phonetics of a group of words, sentences or phrases in the foreign version and in the originally spoken and recorded version are substantially the same, the foreign version produced in accordance with this invention may be substantially perfectly synchronized, even to lip movement.

In such dubbing operations, considerable difficulty is experienced in having the foreign voice synchronize correctly with the picture record. It is essential that the foreign voice record start and stop at the same instants that the original English synchronously recorded sound started and stopped. Moreover, it is usually important that the foreign voice be rendered in substantially the same amplitude as the original voice as otherwise the dramatic effect of the voice may be completely lost.

Heretofore in producing foreign versions, numerous methods have been considered for timing the foreign sound sources. By the term "foreign sound sources", reference will be had to the readers or actors rendering the foreign version or to the musicians, sound effect men, etc., who supply the sound for such foreign version, or the musical conductors, directors of foreign sound sources, etc.

In attempting to correctly time the foreign sound sources, special strips of film have been made bearing thereon cue marks and marks indicating instants at which certain sounds are to be rendered, these films being then projected so as to permit the foreign sound source to observe them and be guided accordingly. Dancing balls and waving batons have been drawn on strips of film and projected for the purposes of visually directing the foreign sound sources. Not only is the formation of these special films costly but in addition it has been found that these expedients do not direct or regulate the foreign sound sources with sufficient accuracy to permit the production of foreign versions which are properly synchronized with respect to the original master pictorial record.

This invention relates to a method which distinguishes from those previously used in that the foreign sound source is permitted to observe visually an indication of the instants of initiation and cessation of sound rendered by it, concurrently and simultaneously with the actual rendition of the sound, such indications of instants of initiation and cessation of the sound being rendered being in close visually comparable proximity to an indication of instants of initiation and cessation of sound carried by the original or master record of sound.

Moreover, the method of this invention permits the foreign sound source to observe the amplitude of his or its voice or sound and visually compare such amplitude with the amplitude of the corresponding portion of the original or master synchronously made record. As a result, the foreign sound source may regulate its rendition not only as to tempo but as to amplitude during rehearsals and/or during the actual recording of such foreign sound.

Generally stated, the preferred embodiment of the invention comprises graphically recording the sound rendered by a foreign source in visually comparable proximity to a simultaneously formed graphical record of the original sound recording, both of these records being made and observed by the foreign sound source during the projection of the original pictorial record which is being projected in synchronism with the original or master sound record. The graphical recordings thus made indicate instants of initiation and cessation of sound and also the amplitude thereof whereby the foreign sound source may control its tempo and amplitude.

In carrying out this method, the original pictorial representation is projected, the original sound recording is reproduced in a sound head, and the foreign voice is converted into an oscillatory or alternating voice current, amplified and preferably rectified, so as to produce a direct current component which then actuates a marking head which graphically records upon a moving tape the instants of initiation and cessation as well as the amplitude of such foreign voice. The original sound is also amplified and rectified, the direct current component of such original or master sound also energizing a polarized marking head so as to produce a graphic record of similar instants of initiation and cessation of sound as well as amplitude.

The two graphic indications or records are preferably made upon a single tape run at a predetermined speed, the tape being marked transversely with lines representing original frame lines. The invention also provides means whereby a relatively small or narrow tape may be readily and continuously examined so as to permit the foreign sound source to visually compare the two records during rendition of sound.

An object of this invention, therefore, is to disclose and provide means whereby sound sources may control their tempo and/or amplitude in accordance with a predetermined tempo and/or amplitude.

Another object of the invention is to disclose and provide a method whereby dubbing may be accurately carried out.

An object of the invention is to disclose and provide means whereby a sound rendered by a source may be observed by said source and visually compared with sound simultaneously reproduced from a master record.

Another object is to disclose and provide means for simultaneously graphically recording instants of initiation and cessation of sound emanating from a source and from a master record.

A still further object of this invention is to disclose and provide a tape representing sound to be reproducibly recorded and sound from a master record.

Another object is to disclose and provide means whereby a relatively narrow tape record representing sound to be reproducibly recorded and master indications of tempo and amplitude variations, can be readily and easily compared.

A still further object of this invention is to provide means whereby the sound which has been rendered for recording in a reproducible manner, can be examined and studied for its suitability as to tempo and amplitude variations, etc., prior to reproduction or editing.

These and other objects and advantages of the invention will become apparent to those skilled in the art from the following detailed description of preferred methods and devices in which the invention is embodied.

In describing the invention, reference will be had to the appended drawings, in which:

Fig. 1 diagrammatically illustrates the primary circuits and arrangement of elements whereby the method of the invention may be placed into operation.

Fig. 2 is a front view, partly broken away, of a device for graphically recording tempo and amplitude variations of a foreign sound source and of a master record.

Fig. 3 is a horizontal section, taken through the device of Fig. 2.

Fig. 4 is a vertical section taken along the plane IV—IV of Fig. 2.

As shown in Fig. 1, the arrangement of units for dubbing may include a projector for motion picture film, indicated at P, having a sound head SH interlocked therewith. In the sound head the original or master sound recording, synchronized with the pictorial representation being projected by the projector P, is converted into an oscillatory current which is then conducted to an amplifier AM—1, by connections 10. The amplified current is then supplied by electrical connection 11, having a switch 12, to a sound reproducer SR positioned back of the screen S on which the pictures are being projected.

The foreign sound source, such as an actor or reader, is positioned in the vicinity of a microphone 14 adapted to pick up the reader's voice and convert it into an oscillatory current, which is then amplified in an amplifier AM—2. This amplified current may then be suitably rectified in a rectifier R—2, suitably filtered, and sent to a marking head MH—2. The amplified master sound current from the amplifier AM—1 may also pass into a rectifier, indicated at R—1, and the suitably rectified current or a direct current component of the sound current, filtered and smoothed out in the same manner as the foreign sound current, is then supplied to a marking head indicated at MH—1. By supplying the marking heads with rectified current, the graphs produced by the marking heads do not exhibit the high frequency oscillations which characterize normal sound currents, thereby rendering the graphs more readily comparable. Furthermore, it is preferable that the marking heads respond to frequencies materially lower than sound frequencies.

The two marking heads MH—1 and MH—2 are installed in a device indicated at 15. The marking heads are preferably polarized devices provided with armatures and fields, the armatures being supplied with the direct current components of the foreign sound source and the master record. The marking heads may be suitably polarized so that the graphical or visible records made thereby are readily distinguishable. The inking points carried by the arms of the marking heads may be provided with inks of different colors and positioned in various degrees of proximity. In the event the marking heads are oppositely polarized, the inking points may be closely adjacent; in the event the marking heads are similarly polarized, it may be desired to space the inking points apart. Various means may be employed for the purpose of distinguishing the respective records of the marking heads. Usually the inking points should be substantially directly above one another in order to facilitate comparison of the respective records. The marking heads may be of various structural types, such as galvanometers, in which the armature responds to the voice currents, but preferably the marking heads are constructed along the lines of the well known dynamic speakers used in radio and motion picture work.

Although the marking heads shown in the drawings are provided with pivoted arms, attention is called to the fact that the intense vibration may loosen pivots and thereby introduce distortion into the graphic records produced by the heads. When dynamic type heads are employed, the mechanical parts connecting the dynamic coil to the vibrating arm must be very rigid. As mentioned hereinbefore, the direct current components supplied to the marking heads should be filtered and smoothed out before being applied to the marking heads, in order to partly compensate for mechanical resonance and low response of the system and also prevent undue response due to the passage of splices through the sound head.

As shown in Figs. 2, 3 and 4, the device 15 in which the marking heads MH—1 and MH—2 are positioned, may comprise a housing containing a feed roll 16 provided with a source of tape 17. The tape is suitably supported and guided as in a guide 18, past the marking heads and past an aperture 19 in the front of the device 15. The tape 17 is advanced by suitable means such as rolls 20 driven by a motor M—3 through a gear box 21.

The linear speed of the tape 17 should preferably be slower than the standard linear speed of the film passing through the projector P and sound head SH. Moreover, the linear speed of the tape 17 should be maintained at a constant known fraction of the normal 90 feet per minute speed of the film in SH. We have found that a speed of 45 feet per minute for the tape 17 (one-half of the normal speed) is very satisfactory. Means for simultaneously driving the projector and sound head and the tape advancing mechanism in the device 15 are provided and such means may either be mechanical, electrical, or a combination of the two.

As shown in the drawings, a motor M—1 supplied with current from a line 30 may be used for driving the projector at the normal film speed. The motor M—3 may be supplied from the same line, the operation of both motors being initiated by closing the circuit as by switch 31. The gear box 21 within the device 15 insures a uniform 45 feet per minute speed for the tape.

As the tape 17 is advanced along the guide 18, it passes the aperture 19. This aperture 19 is provided with a cylindrical lens 22. As the tape 17 lies in the focal plane of the lens 22, an image enlarged in one direction only, namely, transversely of the tape, is visible to the observer through the lens. For this reason the tape 17 may be relatively narrow, say 0.75 or 1.0 inch. In order to render the tape and its graphical representations readily visible, light shields 23 may be positioned above and below the lens 22 and light sources 24 positioned to either side of the shields 23, such light sources 24 being adapted to strongly illuminate the record-bearing face of the tape 17.

The tape 17 may be provided with transverse lines, such as the lines 25, representing frame lines of the master film passing through the projector P. Obviously, when the tape 17 is driven at one-half the linear speed of the film, the lines 25 are spaced one-half the normal frame line spacing of the film. The presence of these frame lines 25 facilitates editing and correlation of the sound record borne by the film and the visual graphical representation drawn upon the tape 17 by marking head MH—1.

When the projector P is operated, the master or original sound record is translated into an electrical current which is then amplified in AM—1, partially rectified and filtered in R—1, and then caused to energize MH—1 which produces a graphical representation on the tape 17. Such graphical representation may take the form of the curve 26. When no sound is being reproduced by SH, the curve 26 would be a straight line. When sound is reproduced, a curve such as 27 will be recorded. Such curve shows the instants of initiation and cessation of the sound, its duration and its amplitude or variations in amplitude.

By reason of the transverse lines 25, the duration of the sound may be readily observed in terms of numbers of frames or length of original film. An indication of the amplitude of the sound is represented by the height of the curve 27 above the normal or quiet level.

As described hereinbefore, MH—2 operates upon an amplified, rectified and filtered sound current picked up by the microphone 14. In the event a foreign sound source, such as a reader, speaks into the microphone 14 while observing the pictures of the master record projected upon the screen S, the reader's voice will cause the marking head MH—2 to inscribe and record upon the tape 17 a graph such as 28. If the foreign sound source is attempting to speak in tempo with the master record, he can readily visually observe whether or not he is actually speaking in tempo. For example, the portion 29 of his graphical representation 28 indicates that he started to speak about a frame length after the corresponding portion of the master record had been reproduced and that the reader ceased to speak about a frame length after the master record ceased reproducing. In other words, the reader exhibited a lag of one frame length. The duration of his speech was identical with that of the master record. In the event the same condition existed throughout the graph, it could be said that the reader's rendition was in perfect time and tempo with the master record but in order to embody it or completely synchronize it with the master film, it would be necessary to shift the reader's reproducible record one frame length with respect to the master record, during editing and combining of such sound record with the corresponding picture record, in order to overcome the one frame length lag which the reader was subject to.

Furthermore, the reader could visually compare the graphical reproduction of the master record and the graphical reproduction of his own voice and see that in the case of portions 27 and 29 the reader had practically duplicated the amplitude variations of the master record.

As shown at 27' and 29', the reader's rendition 29' was entirely too brief. It is evident that the reader again lagged about one frame but he terminated his speech before the master record terminated reproduction of sound so that the reader expressed the sound in a much more brief interval than that consumed by the master record. A condition such as is illustrated in 27' and 29' indicates an unsatisfactory rendition by the reader.

It will be evident, therefore, that the device described hereinabove permits a foreign sound source to visually compare his rendition with that of a master record. During rehearsals, the foreign sound source may observe the projected pictures and may listen to the master sound, such master sound being either reproduced by the sound reproducer SR or the reader may listen to the original sound by means of ear-phones 32 electrically connected as by means of the leads 33 to the sound current as amplified by AM—1.

After rehearsals have been completed or when the reader desires to actually make a reproducible record of his rendition, he may speak into the microphone 34 which is connected with a standard sound recording channel. At the time that actual sound recording of the reader's rendition is being made, the tape 17 may be suitably marked to indicate on the tape that portion which was actually recorded in the sound channel, thereby permitting subsequent editing to be governed by the graphical condensed representation carried by the tape. The tape 17 may be marked by operating a push button which causes a solenoid to impress a distinguishing mark upon the tape or which changes the bias on either of the marking heads, or in some other way definitely cues or marks the tape 17 or the graphical representation being made thereon. The marks may also identify particular phrases, words, scenes, etc., when such identification appears to be desirable. Another method of identifying a particular graph or section thereof may comprise applying a substantially uniform, relatively low frequency to the direct current component being supplied to the marking head (or the extent to which filtering is carried out may be varied), thereby producing a visible variation in the character of the graph drawn by the marking head.

During rehearsals it may be necessary to repeatedly project and reproduce the master record or portions thereof in order to familiarize the foreign sound sources with the tempo and action of such master record. In order to facilitate such repeated projection and reproduction of the master record, the projector P may also be supplied with an auxiliary motor M—2 capable of rewinding the film at a much higher rate of speed than the speed at which the film is normally driven through the projector.

This reversing motor M—2 may be selectively energized by closing its current supply circuit by means of the switch 35. It is to be understood that all of the necessary switches, connections and controls may be embodied in or mounted upon the device 15. Furthermore, the device 15 as well as the projector P, sound head SH and its motor drives, may be movable and enclosed in a sound-proof housing.

Although the description given hereinabove particularly relates to the production of a foreign version of a master record, it is to be understood that the means and methods of this invention are not limited to this particular use. Whenever it is desired to substitute one sound for another and such substituted sound is to be in synchrony with the original sound, the method can be used. Occasionally, for example, an actor is more famous for his acting ability than for the quality of his voice and it may be highly desirable to substitute another person's voice for the original actor's, even though the language is the same. Occasionally it is desirable to change the actual words used even though they be in the same language. Errors and slips of the tongue made during original recording may be corrected by the use of the method and means described.

Those skilled in the art will readily appreciate the numerous adaptations and uses to which the invention described herein may be applied.

It is also to be understood that it is not necessary that the visible comparable records be permanent, ink on paper, curves or graphs. Instead of graphically and visibly recording a direct current component or characteristic of the sounds, the marking heads may be actuated by an unrectified current. Instants of initiation and cessation of groups of sound modulations would still be visibly comparable.

The sound rendered by the foreign sound source (or the electrical current into which it is translated by the microphone, amplifiers, etc.) may cause light sources to be energized or operate a swinging mirror adapted to throw a beam of light upon an observation screen or translucent window, said mirror being responsive in its movements to the variations in the sound current, and thereby visually indicate instants of initiation and cessation and/or duration of sound.

The master record may be rendered visibly comparable in substantially the same manner. The use of a tape on which the tempo and amplitude variations are drawn or marked is preferable, however, as it is possible to observe an appreciable length of record at a glance and the permanence of the record assists in correcting mistakes and facilitates editing of the finished reproducible recordings. It is not necessary, furthermore, that the master record be a reproducible one or one rendered visibly comparable at the same time that the foreign sound is being rendered. The master record may have been graphically represented at some time prior to this test in timing the foreign sound sources. It may bear mechanical indicia of instants of initiation, cessation and duration (and/or amplitude) such as printed, stamped, punched or drawn marks or figures of empirical form.

In this manner, pictures produced without synchronously recorded sound (such as animated cartoons or silent pictures in which the actors simply read their lines) may have synchronized sound records thereafter made therefor, the sound sources observing such previously marked tape while such tape is run at a predetermined speed with respect to the normal projection film speed, for their cues, such sound sources also observing and comparing the sounds rendered thereby with such cue marks carried by the tape.

It is to be understood that the instants of initiation and cessation of sound referred to hereinabove are not limited to such instants as applied to a single word or sound but may well represent and indicate instants of initiation and cessation of a group of words (such as a phrase, sentence or statement) which it is desired to time with respect to another group of words or requence of sounds. It is to be understood that the method and apparatus of this invention are adapted to permit regulation and analysis of a sound being rendered with great accuracy so that each pause and its duration in a sentence, for example, may be properly timed in addition to accurate control as to the instants of initiation and cessation of the entire sentence or group.

All changes, modifications, adaptations, uses and variations of the invention coming within the scope of the appended claims are embraced thereby.

We claim:

1. In a method for facilitating the recording of sound in accordance with predetermined tempo variations, the step of making visible, at the time of rendition, instants of initiation and cessation of sound being rendered.

2. In a method for facilitating the recording of sound in accordance with predetermined tempo variations, the step of making visible, at the time of rendition. instants of initiation and cessation of sound being rendered, said indications of instants of initiation and cessation of sound being made visible in comparable proximity to predetermined indications of tempo, whereby deviation of instants of initiation and cessation of the sound rendered from the predetermined indications of tempo may be visually observed.

3. In a method for facilitating the recording of sound in accordance with predetermined tempo variations, the steps of making visible, at the time of rendition, instants of initiation and cessation of sound being rendered, and simultaneously making visible instants of initiation and cessation of sound from a master record, said visible instants of initiation and cessation of sound from the record and of the sound being rendered being made visible in comparable proximity to each other.

4. In a method for facilitating recording of sound in accordance with the tempo variations of a master record, the step of forming a visible and graphic record of sound to be reproducibly recorded, during the rendition of said sound, upon a tape bearing predetermined visible indications of instants of initiation and cessation of sound, whereby such graphic record may be observed, during rendition of the sound, to determine deviations in instants of initiation and cessation of sound from the predetermined visible indications of instants.

5. In a method for facilitating recording of sound in accordance with the tempo variations of a master record, the steps of converting a master record of sound into visually observable indications of instants of initiation, cessation and duration thereof, and simultaneously and automatically converting sound to be recorded into a visually observable indication of sound, in visually comparable proximity to the indications of said master record, whereby the tempo of sound to be recorded may be visually observed and compared during rendition of said sound, with the indications of said master record, whereby deviations of sound to be recorded from tempo of master record can be determined visually.

6. In a method for facilitating recording of sound in accordance with the tempo and amplitude variations of a master record, the steps of converting sound to be reproducibly recorded into an oscillatory current, obtaining a direct current component of said sound current, graphically recording the direct current component during the rendition of said sound, and simultaneously graphically recording a direct current component of sound reproduced from a master record, said graphic records being made in close proximity to one another whereby they may be visually compared, whereby deviations in instants of initiation and cessation and duration of sound rendered from the tempo variations of the master record can be determined visually.

7. In a method of the character described in claim 6, the step of selectively changing the bias on one of said records for purposes of identifying portions of said record.

8. In a method for timing the rendition of sound, the steps of translating sound to be reproducibly recorded, during the rendition of said sound, into a variable electrical current, and converting said variable current into indications of instants of initiation and cessation of said sound which are visible during the rendition of the sound, whereby instants of initiation and cessation of the sound as well as duration of each sound may be visually observed.

9. In a method of the character described in claim 8, the step of producing visible indications of instants of initiation and cessation of sound in visually comparable proximity to a master record of indications of predetermined instants of initiation and cessation.

10. In a method of the character described in claim 8, the steps of converting said variable current into a substantially permanent visible record of instants of initiation and cessation of sound.

11. In a method of the character described in claim 8, the step of producing a filtered direct current component of the variable current before converting the same into visible indications of instants of initiation and cessation of sound.

12. In a method of timing the rendition of sound in accordance with a predetermined tempo, which comprises making a visible record of said predetermined tempo; rendering sound to be reproducibly recorded, translating said sound into a variable electric current, and converting said current into visible indications of instants of initiation and cessation of said sound in visually comparable proximity to said predetermined tempo record whereby the rendition of sound may be visually governed as to instants of initiation and cessation and duration.

13. In an apparatus for timing and governing the rendition of sounds, the combination of: means for translating sound into a variable electric current; means for converting said variable electric current into visible indications of instants of initiation and cessation of sound; and a visible record of predetermined tempo in proximity to said visible indications, whereby sound being translated and converted may be visually compared with said predetermined tempo during rendition of the sound.

14. In an apparatus for timing and governing the rendition of sounds, the combination of: means for translating sound into a variable electric current; means for converting said variable electric current into visible indications of instants of initiation and cessation of sound, including a tape, a marking head energized by said variable electric current in operative relation to said tape, and means for moving said tape past said head; means for converting a master sound record into a variable electric current, and means for converting said last-named current into visible indicia of instants of initiation and cessation of master sound, said visible indicia being in close visually comparable proximity to said first-named indications, whereby sound being translated and converted may be visually compared with said indicia originating from the master record, during rendition of the sound.

15. In an apparatus for timing and governing the rendition of sounds, the combination of: means for translating sound into a variable electric current including a microphone, electrical amplifying means and a rectifying system; means for converting said variable electric current into visible indications of instants of initiation and cessation of sound including a tape, a marking head energized by said variable electric current in operative relation to said tape, and means for moving said tape past said head; and a visible record of predetermined tempo in proximity to said visible indications, whereby said visible indications may be visually compared with said record of predetermined tempo during rendition of the sound.

16. In an apparatus for timing and governing the rendition of sounds, the combination of: means for translating sound into a variable electric current including a microphone, electrical amplifying means and a rectifying system; means for converting said variable electric current into visible indications of instants of initiation and cessation of sound including a tape, a marking head energized by said variable electric current in operative relation to said tape, means for moving said tape past said head, and lens means positioned in front of said moving tape for enlarging said tape transversely.

17. In a method for facilitating recording of sound in accordance with predetermined tempo, the step of automatically converting sound, while it is rendered, into a graphic representation of instants of initiation and cessation of said sound, whereby said graphic representation may be compared with indications of instants of initiation and cessation at said predetermined tempo to determine deviations therefrom.

18. In an apparatus for timing and governing the rendition of sounds, the combination of: means for translating sound into a variable electric current, means for converting said current into visible indications of instants of initiation and cessation of sound; a motion picture film projector provided with a sound head adapted to translate a record of predetermined tempo into variable electric current, means for rendering said variable current audible, and means for converting said current into visible indicia of instants of initiation and cessation of sound carried by said record of predetermined tempo, said visible indicia being in proximity to said first-named indications, whereby sound being rendered may be visually compared with the sound of said record, during rendition of the sound.

19. In a method for facilitating recording of sound in accordance with the tempo and amplitude variations of a master record, the steps of: converting sound into an oscillatory current, obtaining a direct current component of said sound current, graphically recording the direct current component during the rendition of said sound; simultaneously graphically recording a direct current component of master sound reproduced from a master record, said graphic records being made in close proximity to one another whereby they may be visually compared; and identifying desired portions of one of said graphic records by marking said record during the production of said graphic record from said master record.

20. In a method of timing the rendition of sound in accordance with a predetermined tempo, which comprises making a visible record of said predetermined tempo; rendering sound to be reproducibly recorded, translating said sound into a variable electric current, converting said current into visible indications of instants of initiation and cessation of said sound in visually comparable proximity to said predetermined tempo record whereby the rendition of sound may be visually governed as to instants of initiation and cessation and duration, and identifying desired portions of said predetermined tempo record by marking said record during its formation.

21. In an apparatus for timing and governing the rendition of sounds, the combination of: means for translating sound into a variable electric current; means for converting said variable electric current into visible indications of instants of initiation and cessation of sound, and a visible record of predetermined tempo bearing marks of identification as to portions thereof, in proximity to said visible indications.

GEORGE P. REGAN.
CHARLES S. FRANKLIN.